Oct. 5, 1943.　　　　E. H. SEAL　　　　2,330,847
SCOOP ATTACHMENT FOR TRACTORS
Filed Oct. 22, 1941　　　2 Sheets-Sheet 1
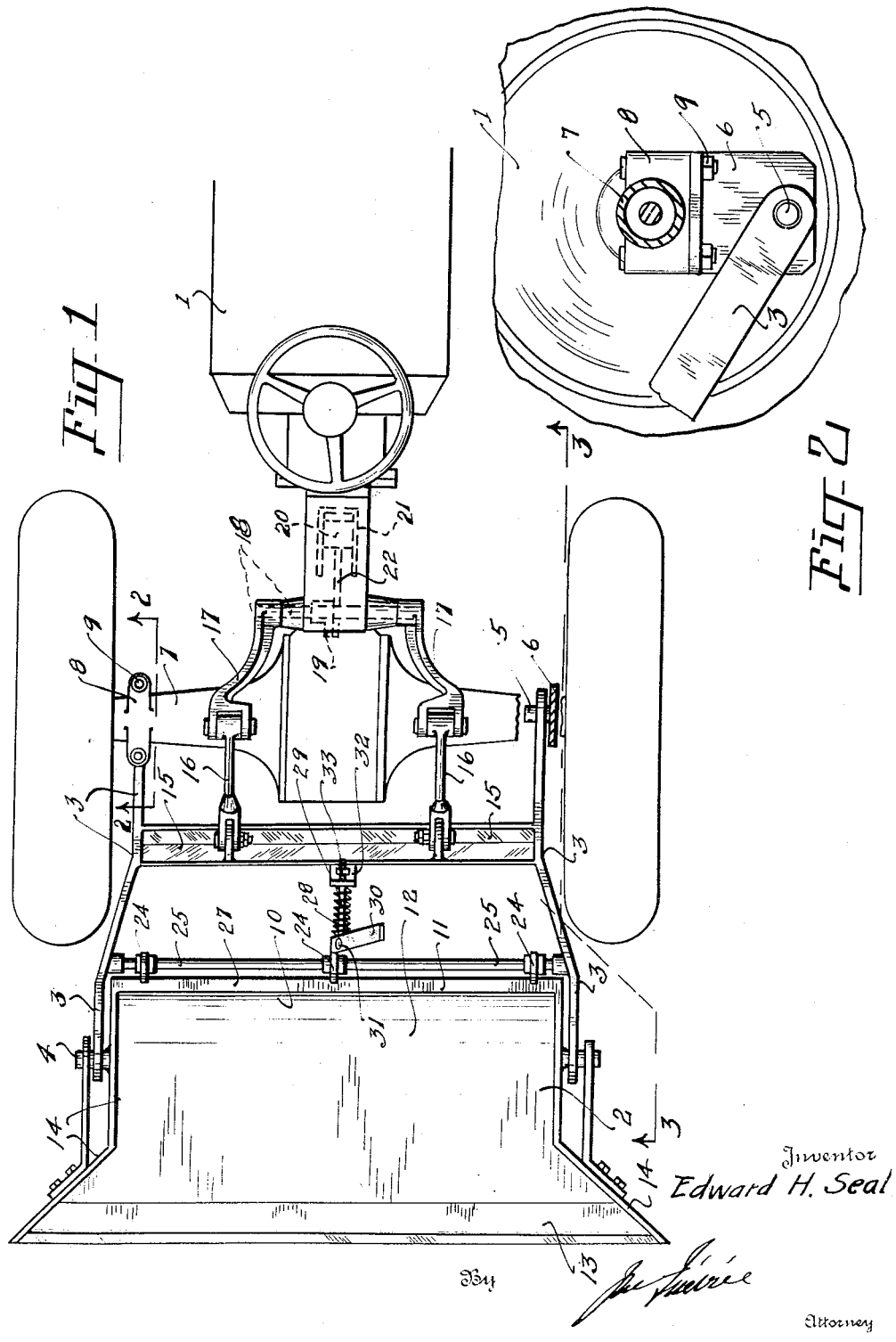
Inventor
Edward H. Seal
By
Attorney

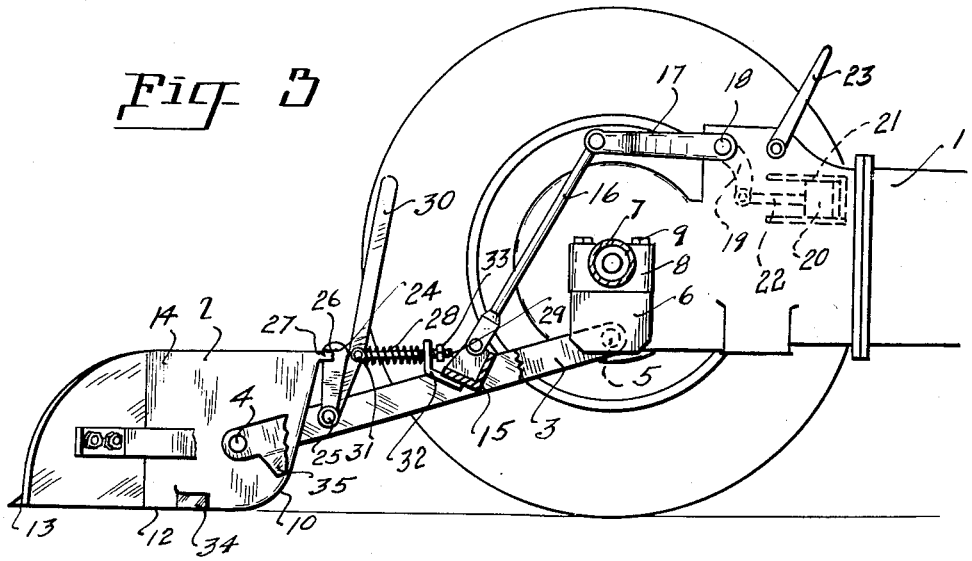
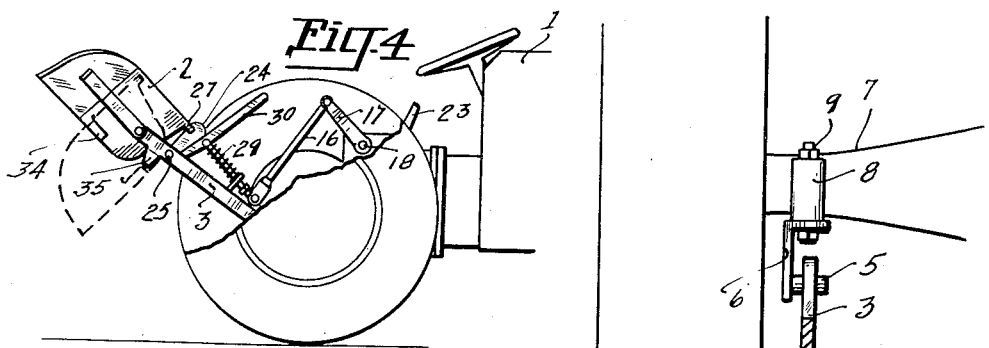
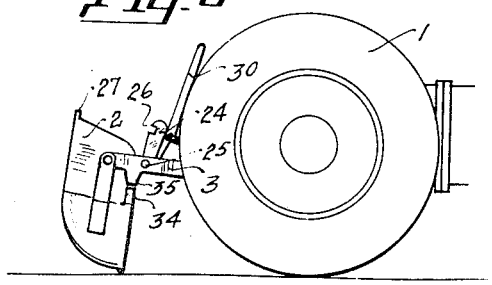

Patented Oct. 5, 1943

2,330,847

UNITED STATES PATENT OFFICE 2,330,847

SCOOP ATTACHMENT FOR TRACTORS

Edward H. Seal, Corvallis, Oreg.

Application October 22, 1941, Serial No. 416,103

1 Claim. (Cl. 37—124)

This invention relates to scoops for tractors and is particularly adapted for the moving of loose materials and for leveling off surfaces.

The primary object of the invention is to attach a scoop, to either end of a tractor, that can be raised and lowered by power means connected to the tractor and that can be dumped by the weight of the materials carried in the scoop when a latch has been released.

Another object of the invention is the mounting of a scoop on the rear or front end of a tractor so that the tractor can be backed into the materials to be scooped without the tractor coming in contact with the pile of material to be moved.

A further object of the invention is to provide a scoop mechanism that can be raised and lowered by a hoisting mechanism of suitable construction forming part of the tractor.

And a further object of the invention is to provide a tripping means for holding the scoop in loaded and carrying position until it is desired to dump the materials, at which time the trip mechanism is manipulated allowing the scoop to dump by its own weight.

A still further object of the invention is to provide means for operating the scoop in a vertical position acting as a bulldozer, scraping or leveling blade.

These and other incidental objects will be apparent in the drawings, specification and claim to follow.

Referring to the drawings:

Figure 1 is a fragmentary plan view of a conventional tractor, having my new and improved scoop attached thereto.

Figure 2 is a fragmentary sectional view of the outer end of the tractor axle, illustrating the manner by which the scoop is attached to the tractor, the same being taken on line 2—2 of Figure 1, looking in the direction indicated.

Figure 3 is a fragmentary side sectional view of the rear of the tractor and the scoop connected thereto in lowered position, taken on line 3—3 of Figure 1, looking in the direction indicated, parts broken away for convenience of illustration.

Figure 4 is a fragmentary side view of the tractor and scoop, the scoop shown in its raised or carrying position, also showing its dumping position by the dotted lines, parts of the tractor broken away for convenience of illustration.

Figure 5 is a fragmentary side view of the tractor and scoop, showing the same operating as a leveling blade or bulldozer.

Figure 6 is a fragmentary sectional view of the scoop frame and its connection to the holding bracket on the tractor axle.

In the drawings:

My invention is adaptable to be used in combination with a tractor 1, and consists of a scoop 2, pivotally mounted to a framework 3 at 4. The forward end of the frame 3 is pivotally connected to the stub shaft 5, which is fixedly mounted to the bracket 6. The bracket 6 is rigidly secured to the tractor, in this particular case being secured to the lower part of the axle 7 to the fitting 8 by the bolts 9.

It will be noted that the mounting 4 is located adjacent the rear 10 of the scoop 2, the reason for which will be described later. The preferred form of scoop consists of a rear wall 11, a bottom 12, a suitable cutting blade 13 and end walls 14. The frame 3 is fabricated together by the cross bar 15, which stiffens the framework and provides a means for connecting the lifting rods 16 to the raising arms 17. The raising arms 17 may be of any suitable construction or type, and in this particular case are part of the tractor, and are of well known construction. The arms 17 are fixedly mounted to the shaft 18, the shaft 18 being revolved by the crank arm 19, which is connected to the piston 20 within the cylinder 21 by the connecting rod 22. This mechanism is of well known practice.

The piston 20 is operated by a fluid, controlled through valves not here shown, said valves being manipulated by a control lever 23. The position of the scoop 2 relative to the frame 3 is maintained in the position shown in Figures 1, 3 and 4 by the holding latches 24. The holding latches are fixedly mounted to the cross shaft 25 on their lower ends and have notches 26 on their upper ends for engaging the rear or lip 27 of the upper rear wall of the scoop 2. The latches 24 are held in locked position, as shown by the spring 28. The spring 28 fits loosely over the rod 29, which is pivotally mounted to the operating lever 30 at 31 at its one end, sliding freely through the bracket 32 at its opposite end, its travel being governed by adjusting nut 33.

In the operation of my new and improved scoop the position of the scoop 2 is determined by the operating lever 23, operating valves not here shown, controlling the position of the operating piston 20. When the scoop is being loaded it is in the position shown in Figures 1 and 3. The frame 3 having been lowered by the lifting rods 16 and the raising and lowering arms 17. The tractor is then backed up into the materials to be loaded into the scoop 2, after which the operating lever 23 is manipulated so as to cause the raising arms 17 to raise the links 16 and the frame 3 to the position shown in Figure 4. This is the position taken while the tractor is conveying the materials to their destination.

In order to dump the material, the lever 30 is pulled towards the tractor revolving the cross shaft 25 and disengaging the holding latches 24 from the ledge or lip 27 of the upper part of the scoop 2. The weight of the scoop and the materials will then revolve the scoop to the position shown by the dotted lines in Figure 4, dumping the materials. This feature, where weight of the material causes the scoop to move to the dotted position for dumping the materials, is one of the prime objects of my invention.

In the event it is desired to operate the scoop as a bulldozer, or leveling blade, it is rotated by its own weight to the position shown in Figure 4. A stop 34 is fixedly mounted to the scoop by any suitable means and as the scoop revolves to the position shown in Figure 4, the stop 34 will contact the stop 35, which is fixedly secured to the frame 3. The scoop now may be used for leveling purposes, similar to a bulldozer or leveling blade. It will also be obvious that the stop 34, when in contact with the stop 35, serves to limit the dumping movement of the scoop to a substantially vertical position, as shown in Figure 5. This prevents the scoop swinging beyond that position, as would otherwise be the tendency under gravital swinging when loaded. The load is thus delivered in a more restricted area and is prevented from being widely spread over an area rearwardly of the scoop.

I do not wish to be limited to this particular form of mechanical construction shown, as other mechanical equivalents may be used, still coming within the scope of the claim to follow.

I claim:

A scoop for use with a tractor, including a scoop proper, spaced arms pivotally supported at one end from and below a tractor axle and pivotally connected at the opposite end to the scoop proper rearwardly of the center of gravity, brackets removably secured to the tractor axle and depending therefrom, stub shafts projecting from the brackets below the axle and pivotally receiving the ends of the arms, a bar connecting the arms substantially midway between the rear end of the scoop proper and the tractor axle from which the arms are supported, a shaft mounted in the arms immediately adjacent the rear end of the scoop proper, locking elements carried by the shaft to cooperate with an edge of the scoop proper to hold such scoop proper in substantially horizontal position, a lever for operating the shaft, means carried by said bar to normally hold the lever and thereby the locking elements in locking cooperation with the scoop proper, manually-controlled means for moving the arms and thereby the scoop proper, said means including rods connected directly to and equally spaced on opposite sides of the longitudinal median line of the bar, a stop on one of the spaced arms rearwardly of its pivotal connection to the scoop proper, and a cooperating stop on the scoop proper to engage the arm-carried stop to hold the scoop proper in a bulldozer position and to also prevent the scoop proper from swinging beyond a substantially vertical position in gravital load discharge.

EDWARD H. SEAL.